United States Patent [19]

Naruse et al.

[11] 4,331,320

[45] May 25, 1982

[54] CLAMP LIFT TRUCK

[75] Inventors: Seiji Naruse, Sodeguara; Fumiaki Maeda, Chiba, both of Japan

[73] Assignee: Lion Corporation, Tokyo, Japan

[21] Appl. No.: 136,055

[22] Filed: Mar. 31, 1980

[30] Foreign Application Priority Data

Apr. 14, 1979 [JP] Japan ............................ 54-49622[U]

[51] Int. Cl.³ ................................................ B60P 1/00

[52] U.S. Cl. .................................... 254/2 R; 254/134; 414/623

[58] Field of Search ............... 254/2 R, 2 B, 133, 134; 414/619, 621, 623; 269/258, 902, 287

[56] References Cited

U.S. PATENT DOCUMENTS

| | | | |
|---|---|---|---|
| 2,821,317 | 1/1958 | Locke | 414/621 |
| 3,929,366 | 12/1975 | Keverline | 414/621 X |
| 4,074,897 | 2/1978 | Behn | 269/902 |
| 4,090,628 | 5/1978 | Sinclair | 414/621 X |
| 4,134,578 | 1/1979 | Stanley | 269/258 |

FOREIGN PATENT DOCUMENTS

| | | | |
|---|---|---|---|
| 903555 | 2/1954 | Fed. Rep. of Germany | 414/621 |

*Primary Examiner*—Robert C. Watson
*Attorney, Agent, or Firm*—Oblon, Fisher, Spivak, McClelland & Maier

[57] ABSTRACT

A clamp lift truck for lifting a rectangular hexahedral stack of boxes incorporating a vertically movable four-side clamp lift employing a plurality of uniformly dimensioned generally flat clamp plates having widths substantially covering the surroundings of the rectangular hexahedral stack of boxes. The flat clamp plates are supported to be adapted for closely abutting against two pairs of opposing sides of the stack of boxes so as to clamp the stack with entirely uniform clamping force. A drive mechanism is utilized for driving the clamp lift into an open position for receiving the stack therebetween and a closed clmap position for simultaneously clamping two pairs of sides of the stack.

1 Claim, 6 Drawing Figures

CLAMP LIFT TRUCK

BACKGROUND OF THE INVENTION

1. Field of the Invention

This invention relates to a clamp lift truck which is capable of clamping four sides of goods which are stacked in the form of a rectangular hexahedron.

2. Description of Prior Art

Pallets are widely used for handling hexahedral stacks of goods, for example, for transhipping or transferring carton boxes of cleansers, foods, medicines and the like. With the propagation of racked storehouses which reduce the space of storage and facilitate the load handling, it has become the general practice to use selectively two types of pallets, namely, ordinary pallets which are used for transportation of goods and rack pallets which are used for storage of goods. The ordinary pallet used for the transportation consists of a low platform which has a plural number of flat plates tightly fixed on upper and lower sides of a number of parallel ribs for distributing as much as possible the load of goods which are stacked thereon in multiple layers. On the other hand, with the rack pallet which is not intended for stacking operation, it is not required to consider the distribution of load but it is necessary to provide a pallet construction which is suitable for automatic travel along rails, the rack pallet normally having a smaller number of plates on the underside thereof.

Therefore, when shipping out goods which have been stored in a racked storehouse, there arises a necessity for replacing pallets. In this connection, the most rational and prompt pallet replacing method is to clamp and lift each stack of goods above the pallet to a height suitable for its replacement.

As for the means for clamping a stack of load, there has been used a side clamp lift 1 which is provided with a pair of clamp plates 3 for clamping opposite sides of a stack 2 of encased goods of rectangular hexahedral shape, as shown in FIG. 1 of the accompanying drawings. However, this type of side clamp lift has a difficulty depending upon the dimensions of unit casing or each carton box of rectangular hexahedral shape as explained hereafter with reference to FIG. 2. In order to stack a maximum number of cases each having a width a, a depth b and a given height on a square pallet having sides of l in length, they are stacked in a mosaic fashion as shown in FIG. 2 for preventing them from easily breaking loose. In this instance, unless $3a=b$, a void space in the form of a square column having sides of a length h is necessarily formed at the center, and, especially in a case where $h=l-2b>a$, stack portions $C_3$ and $C_9$ are left free of the reactions of the clamping force as applied on the opposite sides of the stack by the clamp plates acting in the arrowed directions I—I. If the stack is clamped in the directions of II—II, stack portions $C_6$ and $C_{12}$ are left unclamped and easily fall off when moved.

Similar problems occur also when loading and unloading stacked goods on a vehicle.

SUMMARY OF THE INVENTION

In view of the above-mentioned drawbacks of the conventional clamp lift truck, the present invention has as its object the provision of a clamp lift truck which can clamp four sides of stacked goods to prevent their breaking and allow safe and efficient load-handling.

The above-mentioned object of the invention is achieved by a clamp lift truck which comprises: a vertically adjustable four side clamp lift mounted on the front portion of a lift truck, the four-side clamp lift having a plurality of uniformly dimensioned generally flat clamp plates for clamping two pairs of opposing sides of a rectangular hexahedral stack of goods and a drive mechanism for driving the clamp lift into open position for receiving the stacked goods and closed clamp position for simultaneously clamping the two pairs of opposing sides of the stacked goods.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENTS

Figure 3:
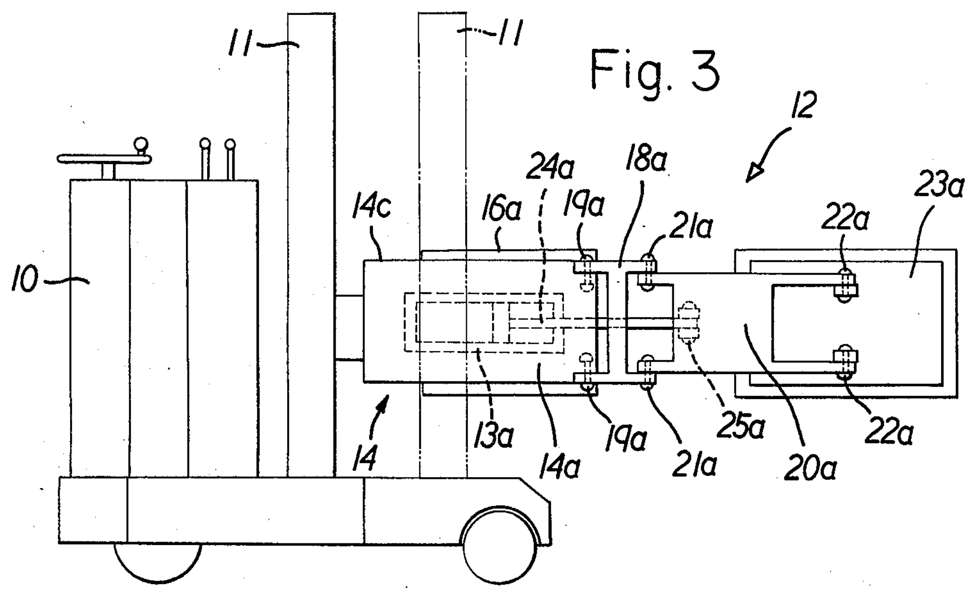
FIG. 3 is a diagrammatic side view of an embodiment of the present invention.
Figure 4:
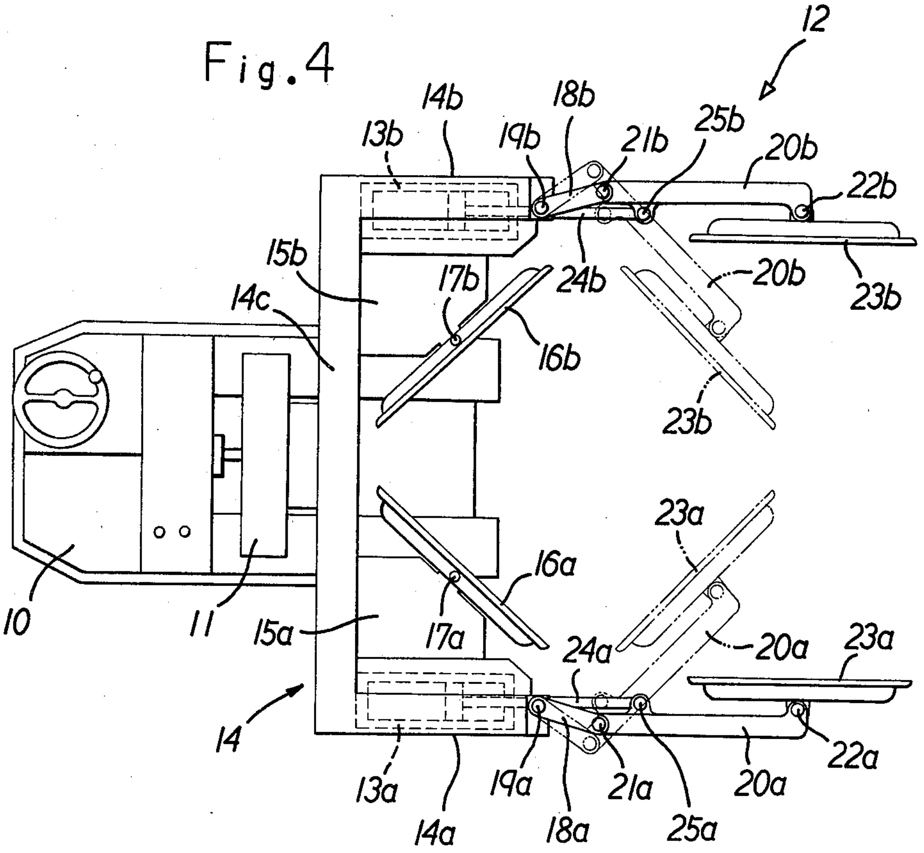
FIG. 4 is a plan view of the clamp lift truck of FIG. 3.

Referring now to FIGS. 3 and 4, a mast 11 is mounted on a front portion of a lift truck body indicatad at 10, the mast 11 being movable back and forth by operation of a fluid-operated cylinder or other suitable means. A vertically adjustable four-side clamp 12 is supported on the mast 11, through a chain block (not shown) as in known lift trucks, to provide a four-side clamp lift. It follows that the four-side clamp 12 can be mounted on known lift trucks in place of the forks.

The clamp 12 is provided with a support frame 14 which is movable up and down along the mast 11. The support frame 14 has a base portion 14*c* which is mounted opposingly on the front side of the mast 11 and is connected to a lift member being capable of upward or downward movements therein, and side extensions 14*a* and 14*b* which are extended forwardly from opposite ends of the base portion 14*c*. On the inner sides of the side extensions 14*a* and 14*b* of the support frame 14, there are provided clamp support portions 15*a* and 15*b* which pivotally support center portions of uniformly dimensioned flat clamp plates 16*a* and 16*b* in cooperation with vertical pins 17*a* and 17*b*, respectively, the angles of inclination of the clamp plates 16*a* and 16*b* thus being adjustable by pivotal movements about the vertical pins 17*a* and 17*b*. As shown in FIG. 4, the uniformly dimensioned flat clamp plates 16*a* and 16*b*, respectively are positioned in a forwardly diverging V-form. The side extensions 14*a* and 14*b* of the support frame 14 support thereon fluid-operated cylinders 13*a* and 13*b*, respectively, which consititute clamp opening and closing mechanisms which will be described hereinafter. One end of link 18*a* and one end of link 18*b* are pivotally connected by pins 19*a* and 19*b*, respectively, to the fore ends of the side extensions 14*a* and 14*b*, respectively. The other ends of the links 18*a* and 18*b* are pivotally connected by pins 21*a* and 21*b* to clamp arms 20*a* and 20*b* respectively. The clamp arms 20*a* and 20*b* pivotally support at the fore ends thereof center portions of uniformly dimensioned flat clamp plates 23*a* and 23 *b* in cooperation with pins 22*a* and 22*b*.

The above-mentioned fluid-operated cylinders 13*a* and 13*b* have piston rods 24*a* and 24*b*, respectively, which are movable back and forth by charging and discharging pressurized fluid which is supplied through flexible piping from a fluid pressure generator such as hydraulic pump (not shown). The fore ends of the piston rods 24*a* and 24*b* are pivotally connected by pins 25*a* and 25*b* to the inner sides of the clamp arms 20*a* and 20*b* at intermediate positions closer to the pins 25*a* and 25*b*, respectively. Thus, as the rods 24*a* and 24*b* of the fluid cylinder 13*a* and 13*b* are driven back and forth, the uniformly dimensioned flat clamp plates 23*a* and 23*b* are oscillated in a horizontal plane between open positions on the extensions of the respective fluid cylinders as indicated in solid line in FIG. 4 and closed or clamp positions facing the inner uniformly dimensioned flat clamp plates 16*a* and 16*b* as shown in phantom in the same figure.

If desired, the uniformly dimensioned flat clamp plates 16*a* and 16*b* may be connected to the support portions 15*a* and 15*b* through fluid cylinders, springs or the like to ensure that the four sides of stacked goods are clamped by uniform forces without unbalanced or localized clamping. In addition, a buffer pad may be provided on the inner side of each uniformly dimensioned flat clamp plate to protect stacked goods against damages which might occur as a result of the clamping operation.

In order to clamp stacked goods with use of the clamp lift truck of the above-described construction, the mast 11 is advanced to the position shown in phantom in FIG. 3 and the rods 24*a* and 24*b* of the fluid cylinders 13*a* and 13*b* are extended forward to hold the uniformly dimensioned flat clamp plates 23*a* and 23*b* in the straight open positions shown in solid line in FIG. 4 to receive a stack of goods diagonally. As soon as two adjacent sides of the stacked goods are abutted against the inner uniformly dimensioned flat clamp plates 16*a* and 16*b*, the fluid cylinders 13*a* and 13*b* are operated to retract the rods 24*a* and 24*b*, whereupon the links 18*a* and 18*b* are pivoted about the pins 19*a* and 19*b* to turn the clamp arms 20*a* and 20*b* toward each other, moving the uniformly dimensioned flat clamp plates 23*a* and 23*b* along an elliptic locus into the clamp positions indicated in phantom in FIG. 4. As a result, four sides of the stacked goods are clamped by the four uniformly dimensioned flat clamp plates 16*a*, 16*b*, 23*a* and 23*b*, holding the stacked goods securely against external forces acting in the directions of I—I and II—II of FIG. 2. As the uniformly dimensioned flat clamp plates are rotatably supported by pins, the entire surface of the clamp plates, by bringing them into the position abutting to the respective sides of the stacked goods, can be positioned in intimate contact with the sides of the stacked goods, thus ensuring the application of uniform clamping force to the sides of the stack. The stacked goods thus clamped are lifted by moving the support frame 14 upwardly along the mast 11, then transporting the stacked goods to a desired place by means of the lift truck body 10. From the view point of the total balance of the truck, the mast 11 may be retracted after lifting the stacked goods in order to ensure the stability.

Figure 1:
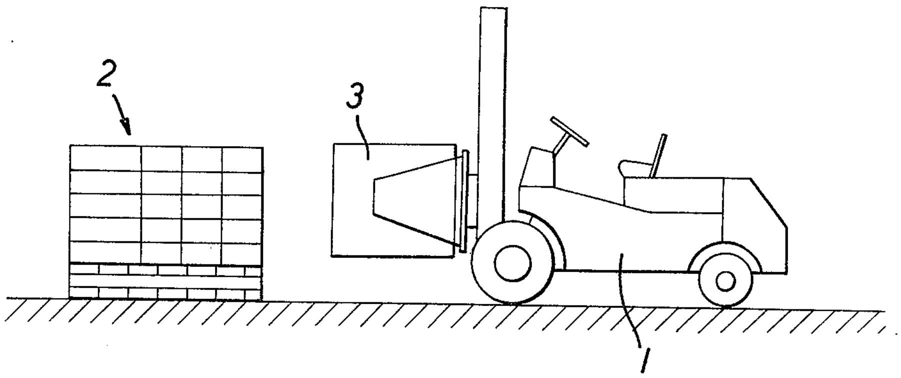
FIG. 1 is a diagrammatic side view of a conventional side clamp lift truck.
Figure 5:
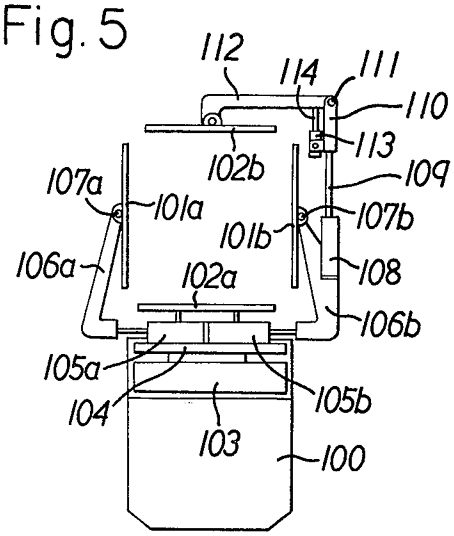
FIGS. 5 and 6 are diagrammatic plan views showing further embodiments of the invention.

FIG. 5 illustrates another embodiment of the present invention as applied to a side clamp lift truck as shown in FIG. 1. In this embodiment, in addition to a pair of ordinary side uniformly dimensioned flat clamp plates 101*a* and 101*b*, there are provided another pair of inner and outer uniformly dimensioned flat clamp plates 102*a* and 102*b*. More particularly, the inner uniformly dimensioned flat clamp plate 102*a* is mounted on a support frame 104 which is vertically movable on the front side of a mast 103 on the lift truck body 100, the position of the uniformly dimensioned flat clamp plate 102*a* being adjustable back and forth by springs or a fluid cylinder. The side uniformly dimensioned flat clamp plates 101*a* and 101*b* are pivotally supported through pins 107*a* and 107*b* at the fore ends of clamp arms 106*a* and 106*b* which are driveable toward and away from each other by means of a pair of fluid cylinders 105*a* and 105*b* which are mounted on the afore-mentioned support frame 104. A fluid cylinder 108 which is fixed on one clamp arm 106*b* is provided for moving the outer uniformly dimensioned flat clamp plate 102*b* back and forth and has a support member 110 at the fore end of its piston rod 109 pivotally connected through a pin 111 to a clamp arm 112 which pivotally supports the center portion of the outer uniformly dimensioned flat clamp plate 102*b*. The clamp arm 112 is pivotally connected to a piston rod 114 of a fluid cylinder 113 which is rotatably mounted on the support member 110, and driveable by the fluid cylinder 113 to rotate between open and closed position by the provision of a valve (not shown) in a fluid passage thereof. In place of the fluid cylinder 113, there may be provided a hydraulically operated cam or gear means for rotating the clamp arm 112.

The above-mentioned fluid cylinders are all operated by charging and discharging pressurized fluid which is supplied through flexible piping from a fluid pressure generator provided on the lift truck body 110.

In order to clamp a stack of goods, the arm 112 is stretched into the open position in line with the arm 106*b* and then the cylinders 105*a* and 105*b* are operated to set back the uniformly dimensioned flat clamp plates 101*a* and 101*b* away from each other into the respective open positions. In this state, the lift truck body 100 is advanced to receive the stacked goods between the uniformly dimensioned flat clamp plates 101*a* and 101*b*, and thereafter the arm 112 is rotated into the closed position perpendicular to the arm 106*b*. Then, while locking the fluid cylinder 113, the fluid cylinders 105*a*, and 105*b* and 108 are operated to grip the opposite side of the stacked goods with the uniformly dimensioned clamp plates 101*a* and 101*b* and at the same time the piston rod 109 is retracted into clamp position. As a result, the stacked goods are clamped by the inner and outer uniformly dimensioned clamp plates 102*a* and 102*b* on the front and rear sides thereof in addition to the uniformly dimensioned flat clamp plates 101*a* and 101*b* which clamp the left and right sides of the stack, so that the stacked goods are clamped on four sides thereof. In this state the four uniformly dimensioned flat clamp plates which are capable of rotating about the pins are caused to face rightly to the four sides of the stack and to abut the sides thereof. Since the uniformly dimensioned flat clamp plate 102*a* is movable forward or rearward, adjustment can be made such that the stacked goods are clamped by uniform forces on the respective sides. The stacked goods thus clamped are lifted by moving the support frame 104 upwardly along the mast 103, then transporting them to a desired place by means of the lift truck body 100.

Figure 6:
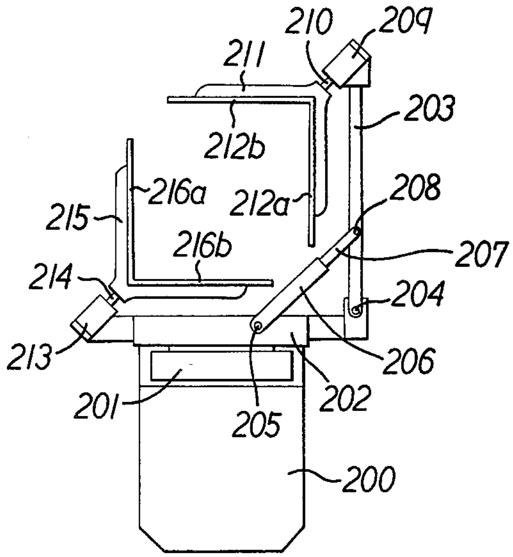

FIG. 6 illustrates a further embodiment of the present invention, in which an arm 203 is pivotally supported by a pin 204 at one side (right end) of a front wall of a support frame 202 which is movable vertically along a mast 201 on a lift truck body 200. A piston rod 207 of a fluid cylinder 206 which is pivotally connected to the frame 202 through a pin 205 is pivotally linked to a middle portion of the arm 203 through a pin 208. Thus, the arm 203 is pivotable about the pin 204 by the operation of the fluid cylinder 206. A fluid cylinder 209 which is mounted at the distal end of the arm 203 has its piston rod 210 extended in a direction away from the arm 206 (to the left), the piston rod 210 having at its distal end an L-shaped, substantially right-angled clamp arm 211 with uniformly dimensioned flat clamp plates 212*a* and 212*b*.

At the other side of the support frame 203 away from the arm 203, there is mounted a fluid cylinder 213 which is positioned opposingly to the afore-mentioned fluid cylinder 209 and which has at the fore end of its piston rod an L-shaped, substantially right-angled clamp arm similar to the clamp arm 211. The clamp arm 215 is likewise provided with a pair of uniformly dimensioned flat clamp plates 216*a* and 216*b*.

Figure 2:
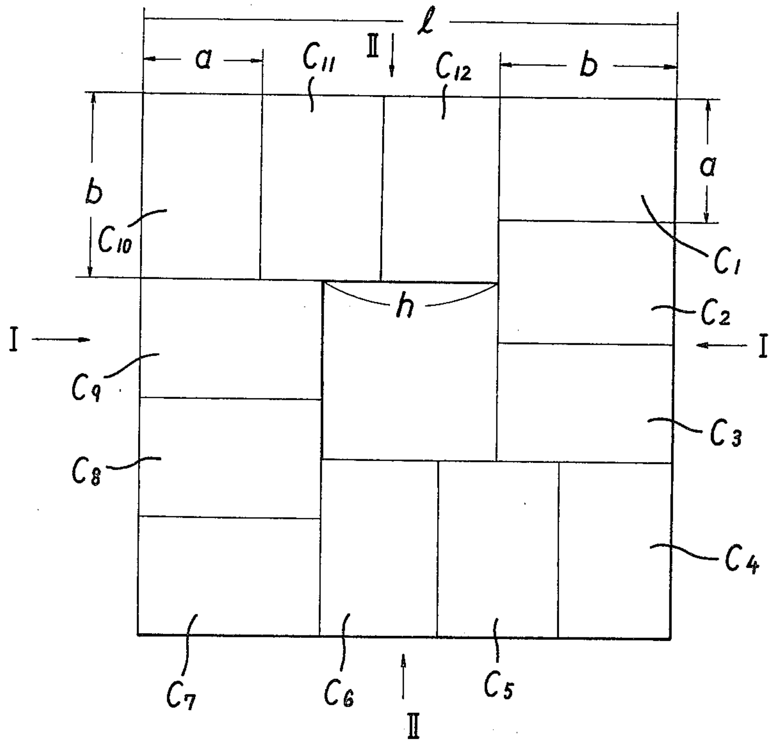
FIG. 2 is a diagrammatic plan view of carton boxes or corrugated board cases which are stacked in a mosaic fashion.

The above-mentioned two fluid cylinders 209 and 213 have the axes of the respective piston rods disposed in the direction of a diagonal of hexahedral stacked goods to be clamped, for example, in the direction of a diagonal of stacked goods in the form of a square pole as shown in FIG. 2. The uniformly dimensioned flat clamp plates 212*a* and 212*b* are respectively placed to become parallel with the opposing uniformly dimensioned flat clamp plates 216*a* and 216*b*.

The above-mentioned fluid cylinders are operated respectively by charging and discharging pressurized fluid which is supplied through flexible piping from a fluid pressure generator provided on the lift truck body.

In order to clamp stacked goods by the above-described clamp lift truck, the clamp arms 211 and 215 are retracted by operating the fluid cylinders 209 and 213 and at the same time the arm 203 is opened to one side of the lift truck (to the right in FIG. 6). In this state, the lift truck is moved until the uniformly dimensioned flat clamp plates 216*a* and 216*b* are abutted against two adjacent sides of the stacked goods. Then, the fluid cylinder 206 is operated to bring the clamp arm 211 in the closed position shown in FIG. 6 and the fluid cylinder 206 is actuated to intimately grip the four sides of the stacked goods by diagonally moving the uniformly dimensioned flat clamp plates 212*a* and 212*b*.

In this manner, the stacked goods are clamped securely with uniform clamping force on the respective surface of each of the four sides to ensure that there is no possibility of the stack being broken up in part when clamped.

As the foregoing description makes clear, the clamp lift truck according to the present invention is capable of securing clamping four sides of a rectangular hexahedral stack of goods, including corrugated board cases or carton boxes which are stacked in mosaic fashion, and can contribute greatly to safe end efficient load-handling.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A clamp lift truck for lifting a rectangular hexahedral stack of boxes comprising:
   - a vertically movable four-side clamp lift comprising:
   - a plurality of uniformly demensioned generally flat clamp plates having widths substantially covering the surroundings of said rectangular hexahedral stacks of boxes, said uniformly dimensioned flat clamp plates being supported to be adapted for closely abutting against two pairs of opposing sides of said stack so as to clamp said stack with entirely uniform clamping force;
   - a dirve mechanism for driving said clamp lift into an open position for receiving said stack therebetween and a closed clamp position for simultaneously clamping said two pairs of sides of said stack;
   - fluid-operated cylinders mounted on said clamp lift; and
   - a pair of opposingly positioned L-shaped brackets; said plurality of uniformly dimensioned flat clamp plates comprising two pairs of uniformly dimensioned flat clamp plates supported on said pair of opposingly positioned L-shaped brackets which are driveable in a diagonal direction thereof into clamp positions by said fluid-operated cylinders, one of said brackets being rotatable for moving one pair of said uniformly dimensioned flat clamp plates between open and closed clamp positions.

* * * * *